United States Patent [19]
Calvet et al.

[11] Patent Number: 4,675,136
[45] Date of Patent: Jun. 23, 1987

[54] PROCESS FOR THE CONNECTION OF OPTICAL FIBRES AND CONNECTING DEVICES OBTAINED ACCORDING TO THIS PROCESS

[75] Inventors: Jean Calvet, Paris; Jean-Claude Cavan, Vincennes; Jean-Claude Thevenin, Velizy, all of France

[73] Assignee: Commissariat a l'Energie Atomique, Paris, France

[21] Appl. No.: 736,683

[22] Filed: May 22, 1985

[30] Foreign Application Priority Data

May 23, 1984 [FR] France ................ 84 08059

[51] Int. Cl.⁴ ............ B29D 11/00; B29C 61/00; B29C 65/02
[52] U.S. Cl. .................. 264/1.5; 264/230; 264/248; 264/320; 264/343
[58] Field of Search .......... 264/1.5, 248, 343, 230, 264/320; 350/96.2, 96.21, 96.22; 425/808

[56] References Cited

U.S. PATENT DOCUMENTS

| | | | |
|---|---|---|---|
| 2,686,337 | 8/1954 | Kaufman | 264/248 |
| 2,860,372 | 11/1958 | Youthed | 264/248 |
| 3,440,118 | 4/1969 | Obeda | 264/248 |
| 4,083,625 | 4/1978 | Hudson | 264/1.5 |
| 4,103,987 | 8/1978 | Kersten | 350/96.21 |
| 4,179,185 | 12/1979 | Hawk | 350/96.16 |
| 4,198,119 | 4/1980 | Uberbacher | 350/96.21 |
| 4,229,402 | 10/1980 | Villarruel et al. | 264/1.5 |
| 4,261,774 | 4/1981 | Lewis et al. | 350/96.22 |
| 4,352,542 | 10/1982 | Tydings | 350/96.21 |
| 4,404,010 | 9/1983 | Bricheno et al. | 264/1.5 |
| 4,423,923 | 1/1984 | Frazier et al. | 264/1.5 |

FOREIGN PATENT DOCUMENTS 0081349 6/1983 European Pat. Off. .
2533709 3/1984 France .

OTHER PUBLICATIONS

Patents Abstracts of Japan, vol. 8, No. 105, 17.5.1984.
Patents Abstracts of Japan, vol. 4, No. 184, 18.12.1980.
Patents Abstracts of Japan, vol. 5, No. 1, 8.1.1981.
IBM Technical Disclosure Bulletin, vol. 23, No. 4, Sep. 1980.

Primary Examiner—James Lowe
Attorney, Agent, or Firm—Pearne, Gordon, McCoy & Granger

[57] ABSTRACT

According to the invention, the process consists of using plastics optical fibres obtained by drawing, the introduction of one of the ends of said fibres into recesses formed for this purpose in mechanical connecting parts, raising the temperature of said ends in order to increase their diameter until they fill said recesses and adapt closely to the internal surface shape of these recesses. It makes it possible to join the ends of optical fibres to centering terminations used for the fitting in the connectors and for producing multiplexing connectors.

9 Claims, 5 Drawing Figures

PROCESS FOR THE CONNECTION OF OPTICAL FIBRES AND CONNECTING DEVICES OBTAINED ACCORDING TO THIS PROCESS

BACKGROUND OF THE INVENTION

The present invention relates to a process for the connection of optical fibres, as well as to a connection device obtained according to this process.

It more particularly applies to the connection of optical fibres made from plastics materials, which can be used for the transmission of optical signals, particularly in the fields of medicine, telecommunications, motor vehicles, avionics, display, decoration, particle physics, etc.

In the transmission of optical signals by optical fibres, the connection of said fibres is one of the critical points and one of the least easy to bring about.

The quality of optical fibre connectors is dependent on several factors and particularly light losses, the reproducibility of these losses during successive connections, the ease of fitting said connectors and their cost.

Plastics optical fibres have the advantage of low cost and easy use. However, due to the fact that they suffer from considerable attenuations, these fibres are mainly intended for use over short distances (less than a few dozen meters), which means that there must be numerous successive connections, so that several connectors are required.

In the state of the art, the optical fibres are fixed by their ends to centering sleeves for fitting them into said connectors.

One of the presently used methods for connecting plastics optical fibres consists of removing the protective covering from the fibres, this being called a mechanical covering as opposed to the optical sheath. This takes place at one of the ends thereof and they are then glued respectively into a centering termination or sleeve. The glue makes it possible to directly bond the centering termination to the optical sheath of the corresponding fibre.

This connection process by gluing leads to special problems and particularly of the compatibility of materials between the optical sheath of the fibres and the glue used. Thus, this glue must be chemically inert with respect to the optical sheath, otherwise it will impair the optical quality of the fibres. Moreover, this glue must have a good adhesion to the optical fibre sheath but also with the generally metallic centering termination. Other problems can result from the use of glue for the connecting of the optical fibres, e.g. the fluidity of the glue, its behaviour on polishing and its setting time.

Another presently used method for the connection of plastics optical fibres consists of fitting the centering terminations to their mechanical covering, either by fastening or gripping a metal part connected to the sleeve, or with the aid of a heat shrinking sheath.

This connection method leads to a certain number of problems, mainly resulting from the fact that the end of the fibres to be connected is mounted freely in the centering termination. Thus, it must be possible to introduce the fibres into the terminations. They are fitted with a clearance in the centering sleeve, so that there is a risk of offcentering of the fibres and even of their removal from the connector in which they are fitted, particularly during a bending of said fibres.

The two aforementioned connection methods (gluing and fastening) are often used together. Apart from their specific disadvantages, they also suffer from common disadvantages. In particular and as shown hereinbefore, the end of the optical fibres to be connected must be freely fittable, i.e. with a certain clearance in the centering sleeve. However, due to the diameter tolerances of the optical fibres, this clearance must be relatively large, which causes difficulties in positioning two optical fibres strictly in front of one another, as well as to a non-reproducibility of light losses at the connections.

SUMMARY OF THE INVENTION

The present invention relates to a process for the connection of optical fibres making it possible to obviate the aforementioned disadvantages, as well as to the devices obtained according to this process.

More specifically, the present invention relates to a process for the connection of optical fibres, wherein use is made of certain plastics materials optical fibres obtained by drawing, one of the ends of said fibres is introduced into recesses provided for this purpose in mechanical connecting parts, the temperature of said ends is raised in order to increase their diameter until they fill said recesses and adapt to the shape of the internal surface of said recesses.

The process according to the invention is based on one of the physical properties of certain plastics optical fibres obtained by drawing from a blank. Thus, during the drawing of these fibres, their molecular structure, during cooling, sets as a drawn structure. However, as a result of a heating to an adequate temperature of said fibres, their molecular structure tends to reassume its initial shape, i.e. prior to drawing, so that there is a swelling of the fibres, accompanied by a shortening thereof.

The optical fibres are, for example, fibres having an optical polyvinyl acetate sheath and a polystyrene core obtained by drawing at a temperature of e.g. 190° C.

According to an embodiment of the process according to the invention, the end of at least one first fibre is introduced at one of the ends of a recess and the end of at least one second fibre to be connected to the first is introduced at the other end of said recess, the hollowed out mechanical connecting parts constituting the connector.

This process makes it possible to position the ends of two plastics optical fibres to be connected strictly in front of one another, no matter what the diameter of said fibres prior to their connection. In addition, it is easily carried out.

Preferably, the ends of the fibres to be connected are freed from their protective mechanical covering.

According to another embodiment of the process according to the invention, the end of several juxtaposed optical fibres is simultaneously introduced into the same recess, which makes it possible to produce a multipoint light guide connection. The mechanical connecting part can in particular be a conical termination.

The introduction of the end of a first optical fibre at the narrowed end of such a termination and the end of several juxtaposed fibres which are to be connected to the first fibre at the widened end of said termination makes it possible to obtain a connecting device used for the multiplexing of optical signals. As a result, it is possible to introduce into the same plastics optical fibre, the optical signals from several optical fibres and conversely to distribute the same signal over several fibres.

According to the main embodiment of the invention, the mechanical connecting parts are centering terminations placed on each of the ends of the fibres to be connected and which are conventionally placed in said connectors. The disappearance of the clearance between the fibre and the centering terminations and the absence of glue make it possible to obviate the disadvantages of the prior art.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
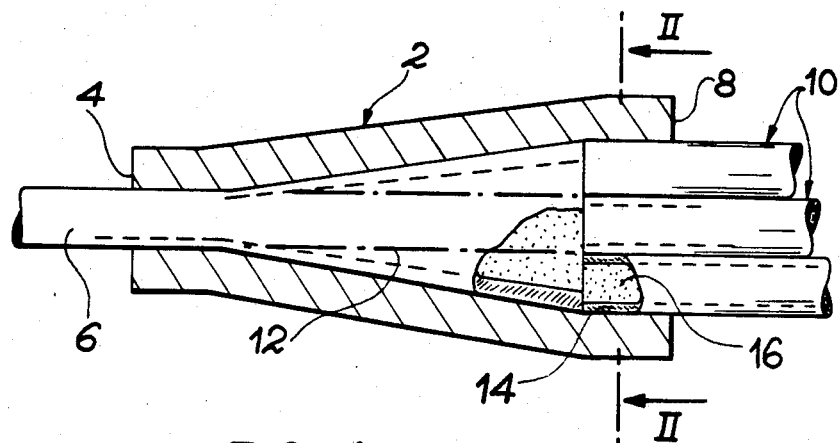
FIG. 1 diagrammatically and in longitudinal section, a connector used for the multiplexing of optical signals obtained according to the process of the invention.

According to the invention, use is made of plastics optical fibres obtained by drawing from a blank. The optical fibres can e.g. be those described in French Patent application No. 8,216,026, filed on Sept. 23rd 1982 in the name of the Applicant. These optical fibres, which are generally provided with a mechanical protective covering have the latter removed from their ends which are to be connected. These bared ends are then introduced into recesses, formed for this purpose in the mechanical connecting parts more particularly constituted by centering terminations or rings to be fitted in connectors in known manner.

In order to take account of the shortening of the ends of the optical fibres during their heating, it is preferable, but not necessary for the ends of the optical fibres to project beyond the corresponding terminations.

The ends of the optical fibres introduced into the centering terminations are then homogeneously heated, in order to increase their diameter until they occupy the entire volume available to them, i.e. the entire interior of the terminations and adapt closely to the inner surface of said terminations. This heating, which brings about a softening of the end of the optical fibres to be connected, is adequate for joining said ends in the centering terminations. In practice, the temperature of the bared ends of the plastics optical fibres can be raised with the aid of a known apparatus (e.g. an oven) by directly heating the centering terminations or the connector in which said terminations are fitted. It is then possible to allow the optical fibres to cool to ambient temperature and then, if necessary, cut off that part of the optical fibres projecting out of the terminations.

This connection process has the advantage of being relatively fast. Moreover, it makes it possible to obtain optical fibres which are perfectly centered in their mechanical assembly and particularly in the centering termination. In addition, it makes it possible to obviate the use of glue and consequently all the problems of the compatibility of materials occurring in the prior art processes. Moreover, it can be used with any type of centering termination and no matter what the material forming the same, provided that said materials have a good quality internal surface state.

The process according to the invention also makes it possible to interconnect two optical fibres positioned in the same centering termination. For this purpose, after removing the mechanical covering from the end of the fibres to be connected, the end of a first plastics optical fibre is introduced at one of the ends of the termination and the end of the second optical fibre is introduced at the other end of the same termination, followed by heating the assembly (termination+fibres) until the bared ends of said fibres fill the entire interior of the termination and finally cooling takes place to ambient temperature. This makes it possible to obtain a fibre to fibre connection.

The process according to the invention can also be used for connecting two groups or bundles of plastics optical fibres. For this purpose, it is merely necessary to simultaneously introduce the bared end of the mechanical covering of a first group of juxtaposed optical fibres at one of the ends of a centering termination, followed by the introduction at the other end of the same termination of the bared end of the mechanical covering of the second group of juxtaposed optical fibres. This makes it possible to obtain a connection of multi-point light guides used for the transmission of images, each pair of connected fibres transmitting an elementary point of said images.

In view of the fact that the temperature rise of certain plastics optical fibres obtained by drawing can lead to an expansion or increase in the diameter of said fibres by a relatively large amount, according to the invention it is possible to produce connectors permitting the multiplexing of the optical signals. Such a connector is shown in FIGS. 1 and 2.

Figure 2:
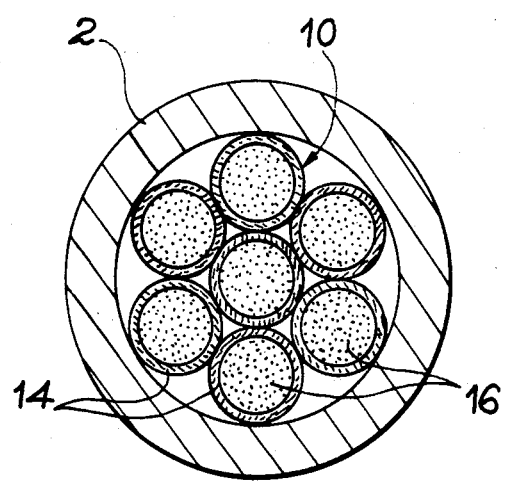
FIG. 2 diagrammatically, a sectional view along plane II—II of the connector of FIG. 1.

In order to produce said connector, use is made of a more particularly metallic centering termination 2, which has a conical shape (FIG. 1). The bared end of the mechanical covering of the first plastics optical fibre is introduced at the narrowed end 4 of said termination 2 and the bared end of the mechanical covering of several juxtaposed plastics optical fibres 10 is introduced at the widened end 8 of said same termination, in order to connect the latter fibres to the former fibre 6. It can be seen that the diameter of the introduced fibre 6 is less than the diameter of the recess constituted by the widened end 8 of the mechanical connecting part or termination 2. This is followed by the heating of the assembly (termination+fibres) until the internal volume of termination 2 is occupied by the bared ends of these optical fibres. In FIG. 1, the dimensioning of the optical fibre 6 in termination 2, prior to the heating stage, is diagrammatically indicated by the mixed line 12.

The thus formed multiplexer connector makes it possible to introduce into the same optical fibre 6 optical signals from various optical fibres 10 and conversely to distribute the same signal, transmitted by optical fibre 6, to different fibres 10.

This connector can e.g. be produced with optical fibres having a polyvinyl acetate optical sheath or cladding 14 and a polystyrene core 16, obtained by drawing at a temperature of 190° C., cf the aforementioned patent application, and a metal termination, by homogeneously heating the assembly to a temperature of approximately 140° C., i.e. to a temperature less than the melting point of the drawn plastics material. The heating of these plastics fibres leads to an increase in their diameter by a factor of 3, so that it is possible to connect the same optical fibre 6 to seven other optical fibres 10 of the same diameter as fibre 6 and as shown in FIG. 2. For example, fibres 10 have a diameter of approximately 1 micrometer.

Figure 3:
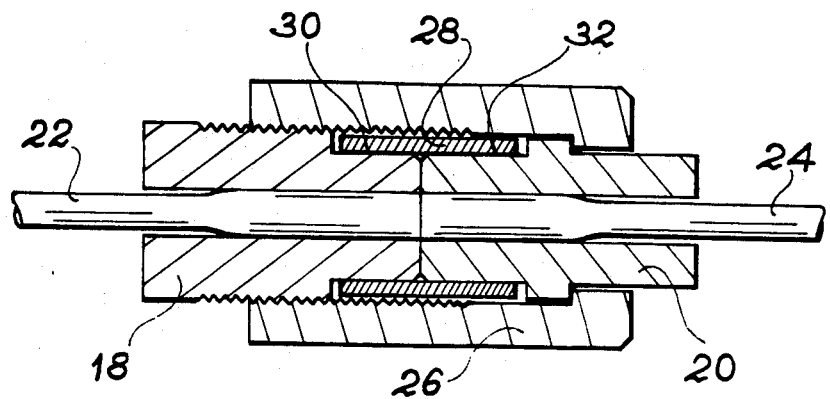
FIG. 3 diagrammatically, and in longitudinal section, a male - female connector for a fibre to fibre connection obtained according to the process of the invention.

FIG. 3 shows a male - female connector for a fibre to fibre connection. The connector comprises two centering terminations 18, 20 in which are respectively fitted, according to the process of the invention, one of the bared ends of a first plastics optical fibre 22 and a second plastics optical fibre 24. These two terminations 18 and 20 are mounted and fitted in a conventional manner in a connector 26. With the optical fibres 22, 24 perfectly centered in their respective terminations 18, 20, whereof they occupy the entire internal volume, the alignment of the ends of the optical fibres 22, 24 to be connected is only dependent on the centering of terminations 18, 20 in connector 26. For example, this centering can be ensured by means of a centering ring 26, in which is fitted or fixed one of the ends of terminations 18, 20, which, for this purpose, respectively have a smaller diameter portion 30, 32.

In order to obtain ends of optical fibres 22, 24 which are in contact with one another, as shown in FIG. 3, it is necessary to fit the end of the optical fibres in the terminations in such a way that they project beyond said terminations, prior to the heating of the same.

Figure 4:
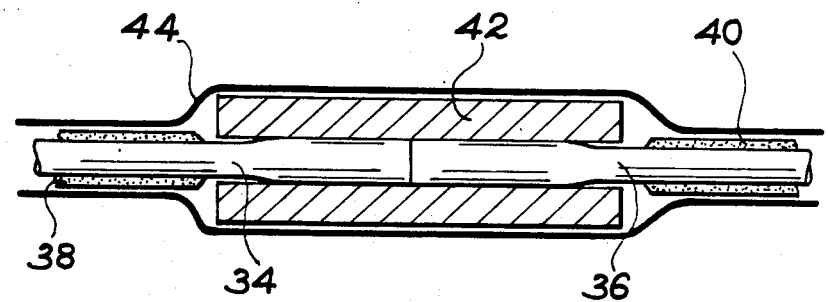
FIG. 4 diagrammatically, and in longitudinal section, a splicing-type connection realised according to the process of the invention.

FIG. 4 shows a splicing-type connection corresponding to the interconnection of two plastics optical fibres. In this type of connection, the ends of the fibres 34, 36 to be connected and which are respectively freed from their mechanical covering 38, 40, are mounted in the same termination 42, which is in particular cylindrical, according to the process of the invention.

If it is wished for the ends of the optical fibres 34, 36 to be in contact with one another and as shown in FIG. 4, it is necessary to maintain them in application with one another during the heating stage, bearing in mind the fibre shortening phenomenon.

As the connection type of FIG. 4 is definitive, the assembly (termination+fibres) can in particular be fitted in a heat shrinking sheath 44.

Figure 5:
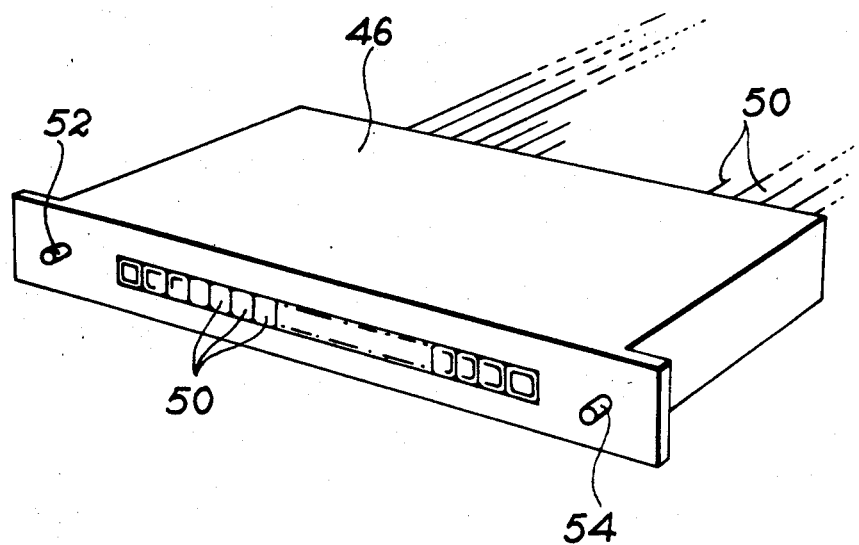
FIG. 5 diagrammatically and in perspective, a multifibre connection obtained according to the process of the invention.

FIG. 5 shows a multifibre connector comprising a parallelepipedic mechanical part 46 with an also parallelepipedic recess 48, in which are placed the bared ends of several plastics optical fibres 50. The latter are adjacent and in the same plane and define a layer of optical fibres.

The end of these optical fibres 50 placed in the mechanical part 46 according to the process of the invention essentially has a square section as a result of the fact that, during the stage of heating the ends of the fibres, the latter swell so as to fill the entire volume available to them and in particular the optical vacuum present initially between the circular optical fibres.

The use of two connectors, as described hereinbefore, makes it possible to connect two layers of optical fibres in fibre to fibre coincidence, the latter being e.g. ensured by two centering pins 52, 54, positioned on the faces of two facing mechanical parts 46.

The different connecting devices described hereinbefore are obviously only given in an illustrative manner and any other optical fibre connecting device can be considered without passing beyond the scope of the invention.

What is claimed is:

1. A process for the connection of optical fibres each having a core and a cladding both made of plastics material, wherein said optical fibres are obtained by drawing, said process comprising the steps of introducing one of the ends of said fibres into recesses provided for this purpose in mechanical connecting parts the diameter of the introduced fibers being less than the diameter of the associated recesses, raising the temperature of said ends to a temperature less than their melting point wherein they expand and increase their diameter until they fill said recesses and adapt to the shape of the internal surface of said recesses.

2. A process according to claim 1, wherein the end of the fibres is freed from its mechanical covering.

3. A process according to claim 1, wherein the end of at least one first fibre is introduced at one of the ends of a recess and the end of at least one second fibre to be connected to the first fibre is introduced at the other end of said recess.

4. A process according to claim 1, wherein said end of several juxtaposed optical fibres is simultaneously introduced into the same recess.

5. A process according to claim 1, wherein each mechanical part is a centering termination used for the fitting of the fibres in a connector.

6. A process according to claim 4, wherein, as the termination has a conical shape, the end of a first optical fibre is introduced at the narrowed end of said termination, whilst the end of several juxtaposed fibres to be connected to the first fibre is introduced at the widened end of the same termination.

7. A process according to claim 6, wherein the number of fibres connected to said first fibre is equal to 7, when said fibres have the same diameter as the first fibre.

8. A process according to claim 1, wherein the fibres have a polyvinyl acetate optical sheath and a polystyrene core.

9. A process according to claim 4, wherein the optical fibres are arranged in the same plane.

* * * * *